United States Patent
Conley, Jr.

(10) Patent No.: US 7,028,268 B1
(45) Date of Patent: Apr. 11, 2006

(54) MULTIPLE DESTINATION BANNERS

(76) Inventor: Ralph F. Conley, Jr., 5571 Shephard Rd., Miamisburg, OH (US) 45342

( * ) Notice: Subject to any disclaimer, the term of this patent is extended or adjusted under 35 U.S.C. 154(b) by 966 days.

(21) Appl. No.: 09/594,955

(22) Filed: Jun. 15, 2000

(51) Int. Cl.
*G06F 9/00* (2006.01)

(52) U.S. Cl. .................................................. 715/841
(58) Field of Classification Search ................ 709/207, 709/218, 220, 221; 705/14
See application file for complete search history.

(56) References Cited

U.S. PATENT DOCUMENTS

| | | | |
|---|---|---|---|
| 5,623,679 A * | 4/1997 | Rivette et al. ............... | 715/526 |
| 5,666,500 A * | 9/1997 | Roberson ..................... | 345/826 |
| 5,717,860 A * | 2/1998 | Graber et al. ................ | 709/227 |
| 5,742,768 A * | 4/1998 | Gennaro et al. ............... | 1/1 |
| 5,778,367 A | 7/1998 | Wesinger, Jr. et al. | |
| 5,787,422 A | 7/1998 | Tukey et al. | |
| 5,790,785 A | 8/1998 | Klug et al. | |
| 5,794,259 A | 8/1998 | Kikinis | |
| 5,796,952 A | 8/1998 | Davis et al. | |
| 5,799,284 A | 8/1998 | Bourquin | |
| 5,819,285 A | 10/1998 | Damico et al. | |
| 5,838,910 A | 11/1998 | Domenikos et al. | |
| 5,838,916 A | 11/1998 | Domenikos et al. | |
| 5,845,299 A | 12/1998 | Arora et al. | |
| 5,848,396 A | 12/1998 | Gerace | |
| 5,848,427 A | 12/1998 | Hyodo | |
| 5,854,897 A | 12/1998 | Radziewicz et al. | |
| 5,937,392 A | 8/1999 | Alberts | |
| 5,948,061 A | 9/1999 | Merriman et al. | |
| 5,960,409 A * | 9/1999 | Wexler ........................ | 705/14 |
| 5,974,451 A * | 10/1999 | Simmons ..................... | 709/218 |
| 5,999,912 A | 12/1999 | Wodarz et al. | |
| 6,014,698 A | 1/2000 | Griffiths | |
| 6,026,417 A | 2/2000 | Ross et al. | |
| 6,028,604 A | 2/2000 | Matthews, III et al. | |
| 6,141,010 A * | 10/2000 | Hoyle ......................... | 345/854 |
| 6,182,050 B1 * | 1/2001 | Ballard ........................ | 705/14 |
| 6,219,696 B1 * | 4/2001 | Wynblatt et al. ............ | 709/218 |
| 6,337,699 B1 * | 1/2002 | Nielsen ....................... | 345/837 |

(Continued)

*Primary Examiner*—Andrew Caldwell
*Assistant Examiner*—Douglas Blair
(74) *Attorney, Agent, or Firm*—Steven J. Rosen

(57) ABSTRACT

The present invention provides software, methods, and computer systems for displaying banner ads with a set of navigation options presented to an end-user, such as a customer or consumer, who selects or clicks on the displayed banner ad. The navigation options include URLs on a network to which the end-user computer is connectable. The invention includes software, systems, and methods for allowing the publisher to define and update the set of options. The invention includes software, systems, and methods for recording display event statistics for the banner ad whether the end-user is viewing the banner ad either off-line or on-line. The invention also includes a means for targeting and sending messages across the network to end-users.

55 Claims, 18 Drawing Sheets

U.S. PATENT DOCUMENTS

| | | | |
|---|---|---|---|
| 6,493,702 B1 * | 12/2002 | Adar et al. | 707/3 |
| 6,496,857 B1 * | 12/2002 | Dustin et al. | 709/219 |
| 6,556,975 B1 * | 4/2003 | Wittsche | 705/26 |
| 6,571,245 B1 * | 5/2003 | Huang et al. | 707/10 |
| 6,587,118 B1 * | 7/2003 | Yoneda | 345/629 |
| 6,587,127 B1 * | 7/2003 | Leeke et al. | 345/765 |
| 6,591,248 B1 * | 7/2003 | Nakamura et al. | 705/14 |
| 6,636,247 B1 * | 10/2003 | Hamzy et al. | 345/808 |
| 6,642,946 B1 * | 11/2003 | Janes et al. | 715/854 |
| 6,678,663 B1 * | 1/2004 | Mayo | 705/14 |
| 6,697,838 B1 * | 2/2004 | Jakobson | 709/203 |
| 6,802,042 B1 * | 10/2004 | Rangan et al. | 715/501.1 |
| 6,829,646 B1 * | 12/2004 | Philyaw et al. | 709/228 |
| 6,922,816 B1 * | 7/2005 | Amin et al. | 715/833 |
| 6,941,524 B1 * | 9/2005 | Lee et al. | 715/854 |
| 6,948,135 B1 * | 9/2005 | Ruthfield et al. | 715/854 |

* cited by examiner

FIG. 4C

Email Options

| | Display Name | EMail | Order |
|---|---|---|---|
| ☐ | Questions? Comments | info@egoware.com | 4 |
| ☐ | Need help or support? | support@egoware.com | 5 |
| ☐ | | | |
| ☐ | | | |
| ☐ | | | |

File Options

| | Display Name | File Name | Order |
|---|---|---|---|
| ☐ | E-Cupon | Browse... | 6 |
| ☐ | E-News | Browse... | 7 |
| ☐ | Introduction | Browse... | 8 |
| ☐ | Publishing Guide | Browse... | 9 |
| ☐ | | | |

URL Options

| | Display Name | File Name | Order |
|---|---|---|---|
| ☐ | Home Page | www.ncr.com | 1 |
| ☐ | Product On-Line | www.ncr.com/sorters/supplies/rop | 2 |

Usage Summary for d-53

Your product is distributed electronically. Here is the current status of download quantities.

| Authorized Qty | Current Downloads | Remaining |
|---|---|---|
| 100 | 0 | 100 |

Click on any month to view the month's detailed data.

| Month | Products in Use | Ad Views | Ad Clicks | Link Clicks |
|---|---|---|---|---|
| 02/2000 | 4 | 19 | 160 | 107 |

MULTIPLE DESTINATION BANNERS

BACKGROUND OF THE INVENTION

1. Field of the Invention

The present invention relates generally to banner software and methods of using such software to navigate networks such as the World Wide Web (WWW), intranets and extranets and, more particularly, to customizable banners that offer menus to multiple URLs and other destinations on the network.

2. Discussion of the Background Art

Business marketing is very desirable of targeting their customers needs and interests as part of their effort to sell products and services. The advent of the global network termed the Internet, called the World Wide Web (WWW or WEB) has opened up an entire new medium for marketing in conjunction with entertainment, educational and business information and services available to end-users.

Marketing over the portion of the Internet known as the World Wide Web, or "Web" for short, is growing. Advertisements on the Web are commonplace, sophisticated, and elaborate, and Internet advertising expense is expanding accordingly. In many Web applications, advertisements are presented as banners that are displayed prominently on a Web display, referred to as a Web page. If a user is attracted by the banner or banner advertisement, the user can click-on the banner (i.e., by positioning a screen cursor on the banner and then depressing a button on a mouse or other input device). The banner has an underlying "hyperlink" to another Web site that is associated with the banner, usually the home site of the advertiser. Clicking on the banner invokes a path to the advertiser's designated page or hyperlink. Typically, the name of the path is presented to the user in the form of a single uniform resource listing ("URL") followed by a directory path designating the particular page in the site that the advertiser wishes to be displayed.

In recent years, the emergence of the World Wide Web as a venue for marketing and brand-building has created a great demand for the use of images and multi-media files which can be displayed on World Wide Web pages as advertisements by a sponsor. Such images are typically GIF or JPEG image format files of a specified dimension, which are inserted either statically by an HTML author at the time an HTML page is created or inserted dynamically in an HTML page by advertising banner rotation software residing on a remote Web server or other server computer. Typically, when such a banner is presented to the end-user via a Web browser, this display event is recorded via the remote advertising banner rotation software. If the user should click-on or select the displayed banner, a single course of action is performed, which is normally to transfer the end-user, via their browser, to an alternate WWW page or URL through an HTML hyperlink.

Banner ads can be created using various rich media technologies, such as the Java development language or in various multi-media formats such as Macromedia Flash or Shockwave. Banners developed using one of these programming based tools allow the developer to associate a wide range of applications with a banner ad, however, the process of programming a rich media banner advertisement requires considerable technical expertise.

Several disadvantages are inherent in the present state of banner technology. Although Web pages may be viewed off-line, i.e. when the user is not currently connected to the Internet, no record of such ad banner viewing is captured which leads to under-reporting of end-user behavior to the ad sponsor, i.e. the number of times their ad has been viewed by a user. A sponsor or advertiser is limited to specifying a single course of action for the user in the event the user selects or clicks on their displayed banner ad.

It is highly desirable to have a method and system which (i) permits banner ad viewing data to be captured whether the banner ad is viewed on-line or off-line; (ii) allows the sponsor, advertiser, or publisher of the banner to specify multiple events or sites to which the user may go when the user clicks on the displayed banner; and (iii) allows these events, sites, and options to be specified, changed, and updated by the advertiser, sponsor, or publisher with only novice computer level skills.

When a user clicks on a banner advertisement, the user indicates that he or she has gained an "impression" of the advertisement. These types of advertisements are limited in scope in that they give the viewer only one URL to go to. The user's interest can be increased by giving the user more choices or opportunities to view different targeted advertisements or URLs related to marketing. It is, therefore, highly desirable to be able to provide a more interesting banner to a viewer or end-user both on-line when connected to a network such as the World Wide Web (Internet) or intranet and off-line when not connected to a network. It is also desirable to provide advertising information to the customer in a fashion that will enhance the viewer's experience of using the Internet and encourage the user to visit the advertiser's banner. It is also highly desirable to provide a system for the advertiser or publisher to create, update, and change choice's and content of the banner.

There is a need for making a set of options available to the end-user, particularly, a customer or consumer that selects or clicks on a displayed banner ad. There is also a need for a system and method for allowing the publisher to define, update, and periodically update, with novice level computer skills, the set of end-user options presented to the end-user when the end-user selects or clicks on a displayed banner ad. There is also a need for capturing display event statistics for a banner ad whether the end-user is viewing the banner ad either off-line or on-line.

SUMMARY OF THE INVENTION

The present invention includes software, methods, and computer systems for displaying banner ads with a set of navigation options presented to an end-user, such as a customer or consumer, who selects or clicks on the displayed banner ad. The navigation options include URLs on a network to which the end-user computer is connectable. The invention includes software, systems, and methods for allowing the publisher to define and update the set of options. The invention includes software, systems, and methods for recording display event statistics for the banner ad whether the end-user is viewing the banner ad either off-line or on-line. The invention also includes a means for targeting and sending messages across the network to end-users.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

FIG. 4C is a second HTML page illustrating a screen used by the publisher to define navigation options offered in the banner.

FIG. 8 is an illustration of a screen display of an exemplary usage report screen available to the publisher and distributor of the advertising module.

DETAILED DESCRIPTION

Figure 1:
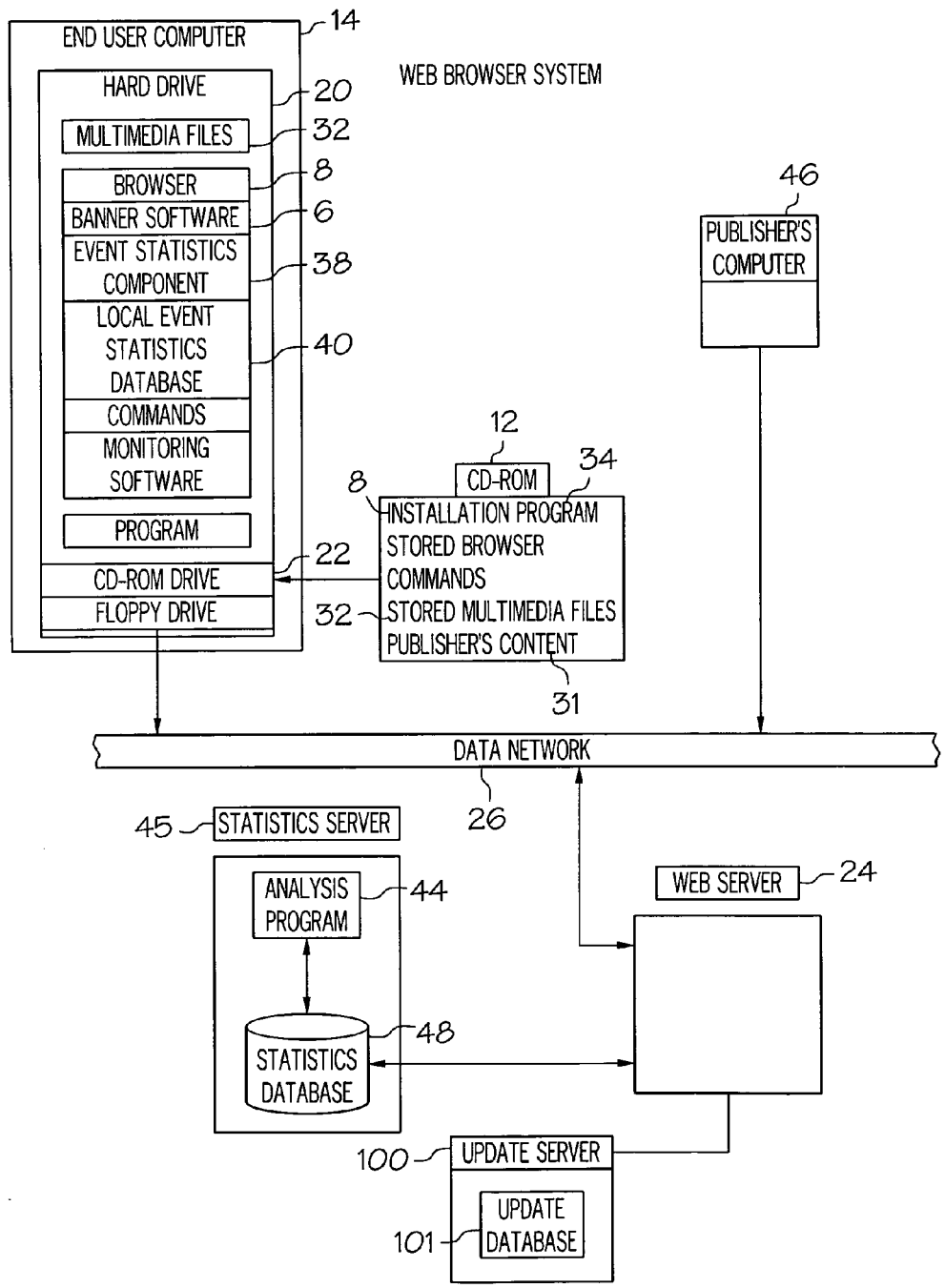
FIG. 1 is a block diagram illustrating a system for employing an exemplary embodiment of banner software of the present invention.

Illustrated in FIG. 1 is a block diagram of a networked banner display system 10 including banner software 6 of the present invention and a Web browser 8 also referred to as Web browser software. The Web browser 8 typically is stored on and installable from a distribution means such as a storage media such as a CD-ROM 12 for distribution by a third party publisher such as a business. The banner software 6 is designed to be a stand alone application, or packaged with another type of application, or may be included as part of the browser and/or may be installed separately after the browser 8 has been installed. The Web browser 8 is used by an end-user on an end-user computer 14 which is typically a PC or personal computer. The end-user computer 14, typically, includes a fixed storage means such as a hard disk drive 20 and a removable storage means such as a floppy disk drive or a CD-ROM drive 22 for retrieving files from the CD-ROM 12. The end-user computer 14 interfaces with a network server such as a Web server 24 through a network 26 such as the Internet with a modem or direct connect to the network server or another type of network such as a LAN or intranet. Other software stored on distributable storage media includes publisher content 31, in the form of multi-media files 32 and an installation program 34 for installing the browser 8 and at least some of the multi-media files 32 on the hard drive 20 of the end-user computer 14. The banner software 6 may also be installed after downloading through network 26 such as the Internet or on diskette or CD-ROM. The distribution means also includes, but is not limited to, floppy diskettes, CD_DVD, and via transfer over an electronic data network to end-users. Typically, the software is stored in a compressed format on the CD-ROM 12.

Figure 1A:
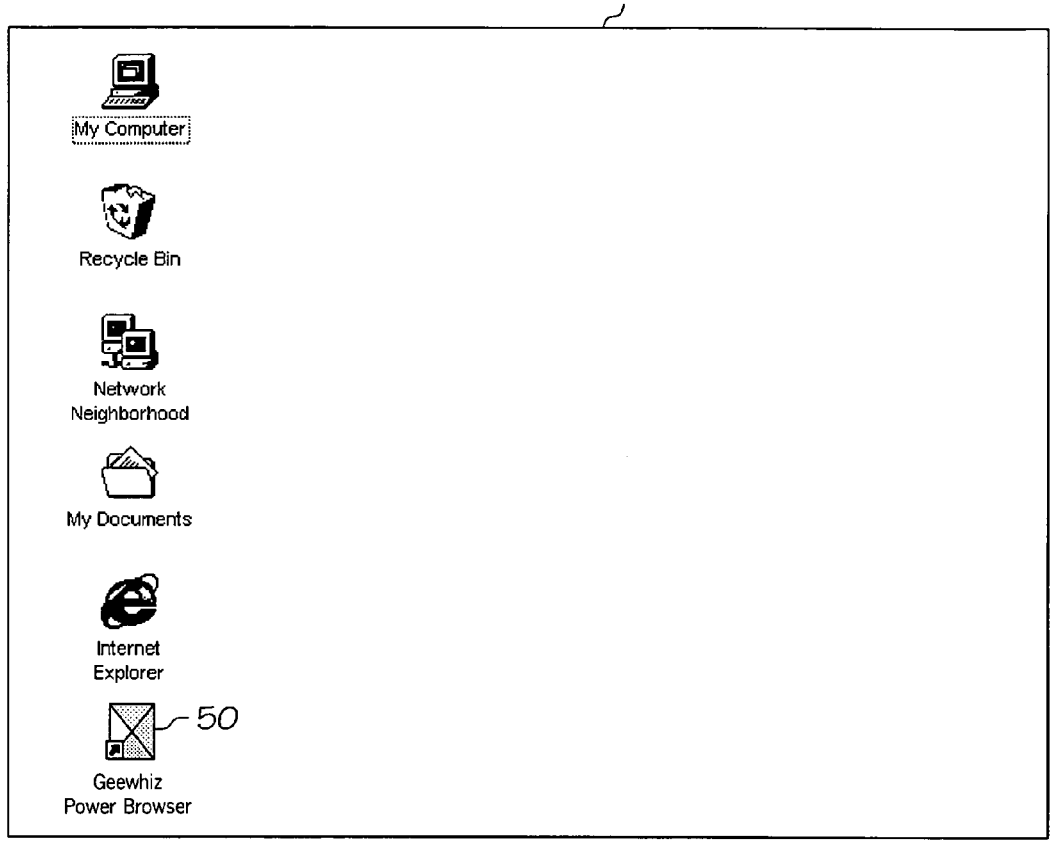
FIG. 1A is an illustration of a GUI and icon in a Microsoft Windows Desktop screen.

Installation programs are invoked by the end-user to install the browser 8 and/or a stand alone application with the banner software 6 on the hard drive 20 on the end-user computer 14. During installation, end-user demographic data is inputted by the end-user and stored. Demographic data typically includes an area code and zip code, etc. and the installation program also includes an end-user identification number that is associated with the installation and used to identify the end-user in various records, reports, and transactions. One particularly useful browser 8 is described and disclosed in U.S. patent application Ser. No. 09/396,667, filed Sep. 15, 1999, entitled "WEB BROWSING AND MARKETING SOFTWARE", and is herein incorporated by reference. The publisher content stored on the hard drive 20 is accessible by the end-user using the browser 8 which can use and display the content stored on either or both the hard drive and the CD-ROM. The installation program also installs a customized browser icon 50 on a graphical end-user interface (GUI) which appears on a screen 52 of the end-user computer 14 as illustrated in FIG. 1A.

The publisher content includes many types of files such as electronic documents, multi-media files, ActiveX objects, plug-ins for publication on a CD-ROM, video files, audio files, graphic files, Flash files, Shockwave files etc., JAVA applets, ActiveX controls and HTML files. The browser 8 is software having many functional components as described in U.S. patent application Ser. No. 09/396,667. The browser is preferably an object oriented computer code used by many software programmers. The components are computer codes that may be written as computer programs or sub-programs or sub-routines of computer programs as well as object code.

The browser software 8 and/or the banner software 6 includes an event statistics component 38 which is software for monitoring end-user behavior and maintaining a local event statistics database 40 of end-user behavior on the end-user computer 14 and, preferably, on the hard drive 20. The end-user behavior is determined by monitoring events that occur, while, the end-user uses the browser. The event data is stored in the end-user computers 14 and is automatically transmitted by the browser to the Web server 24 when the end-user computer 14 is connected to the network 26.

Figure 2:
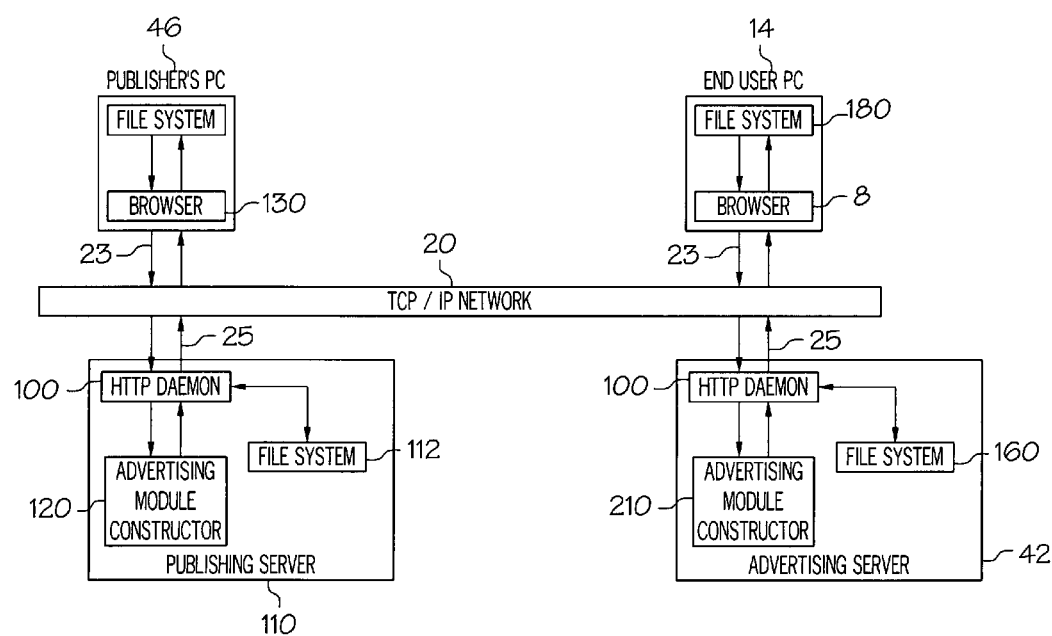
FIG. 2 is a block diagram of an exemplary system of the current invention for producing and using an advertising module which incorporates the banner and the banner software of the present invention.

The banner software 6 of the present invention has one particular use for advertising on the Internet, an example of which will be explained further, later in the patent. A block diagram of an exemplary system of the current invention is illustrated in FIG. 2. A publishing server 110 accepts publisher input, data and files, which may be stored on a publishing server file system 112 (typically a hard drive system), from a publisher computer 46 operated by the publisher which communicates with the publishing server 110 using an HTTP daemon 100 from an HTTP compliant client browser 130 over a TCP/IP network 26, such as the Internet. The publisher can be an advertiser on the Internet and the publishing server 110 can be maintained by a third party vendor to the publisher. Data and files received by the HTTP daemon 100 are temporarily stored in a publishing server file system 112 accessible by the publishing server 110. These files are used by publishing software illustrated as an advertising module constructor 120 to create interactive advertising modules 210 which, in one embodiment, the publisher directs to be embedded within HTML documents or related applications capable of incorporating software objects created using Microsoft ActiveX technology or Java. The advertising module 210 is the banner software 6 embedded within an HTML documents or related application such as a database program or even browser 8.

The interactive advertising modules 210 created on the publishing server 110 can be hosted anywhere on the networked system 10, it is illustrated herein on an advertising server 42. Referring briefly to FIG. 1, the interactive advertising modules 210 can be stored on any Web server such as one operated by the publisher or advertiser or operated by another party such as the advertising server 42. The advertising modules 210 can be distributed over the network or by a floppy disk or on a CD-ROM as a stand alone application of within another application. The advertising modules 210 may also be located in the browser 8 or as part of the banner software 6 or in the publisher content 31. These are examples of the means for storing the banner software for distribution to and installation on the end-user computer.

Referring back to FIG. 2, the advertising server 42 and publishing server 110 can be on two separate computers or on one computer which may be owned or controlled and maintained by the vendor. The advertising modules 210 may be embedded within HTML documents or applications or similar files and stored in an advertising server file system 160 on the advertising server 42. In this manner, the advertising modules 210 are made available over the network 26 via the HTTP daemon 100 to end-users on their end-user computers 14 that can access the advertising server 42 through an HTTP compliant Web browser via standard HTTP requests 23 or similarly capable software application via a TCP/IP network 26, such as the Internet. The advertising server 42 transmits the advertising module 210, and related files, via standard HTTP server responses 25 to an end-user file system 180 on the end-user computer 14, where, for example, it is stored on the hard drive 20.

In operation, the publisher or advertiser directs the publisher computer 46 to communicate via HTTP requests 23 with the publishing server 110 via the TCP/IP network 26 and use publishing software on the publishing server to create and/or update the advertising modules 210. Once the publisher computer 46 establishes a communication link with the publishing server 110, the publishing server's HTTP daemon 100 presents an HTML-based user interface with the publishing software to the HTTP compliant client browser 130 located on the advertising producer computer via HTTP server responses 25.

Figure 3:
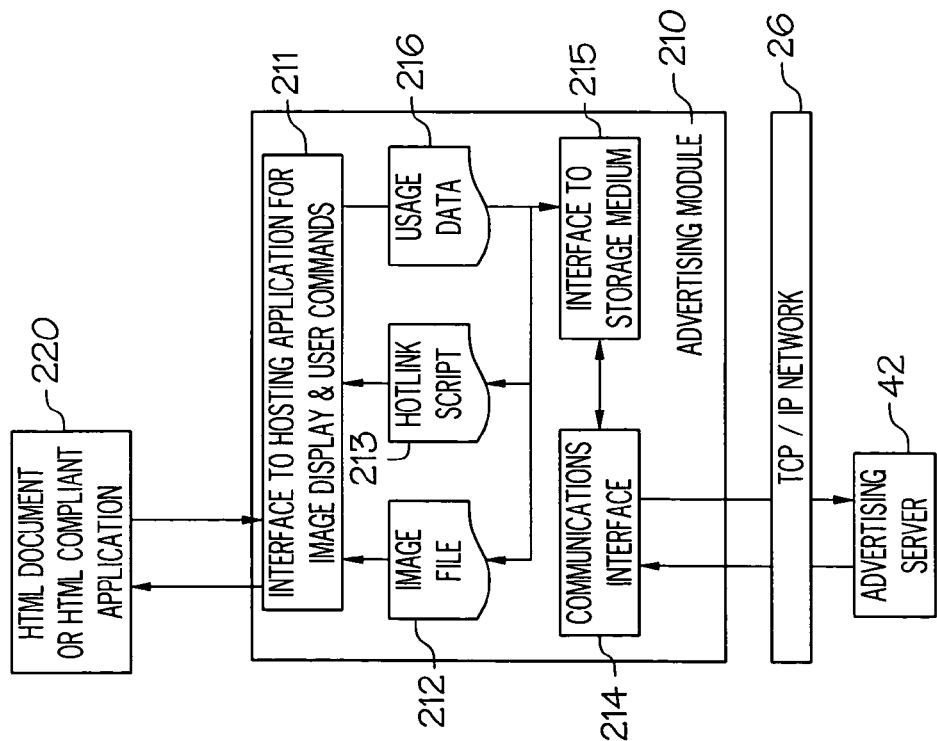
FIG. 3 is a block diagram illustrating architecture for an advertising module which incorporates the key advertising display, end-user navigation and usage reporting aspects of the banner software of the present invention.
Figure 5:
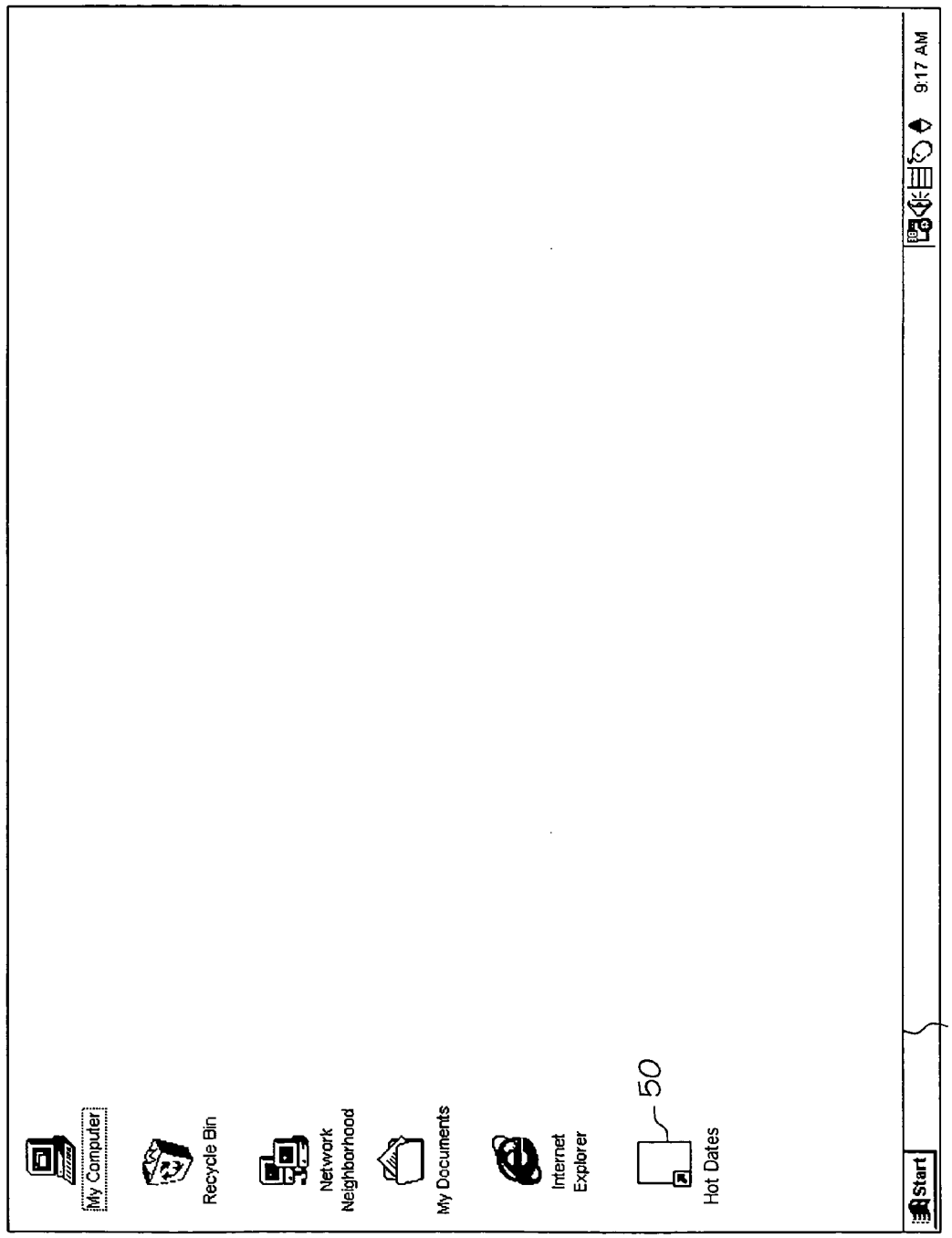
FIG. 5 is an illustration of an icon, in a Microsoft Windows Desktop screen, for launching an exemplary stand alone application having a customized advertising module for displaying an exemplary banner ad of the present invention.
Figure 5A:
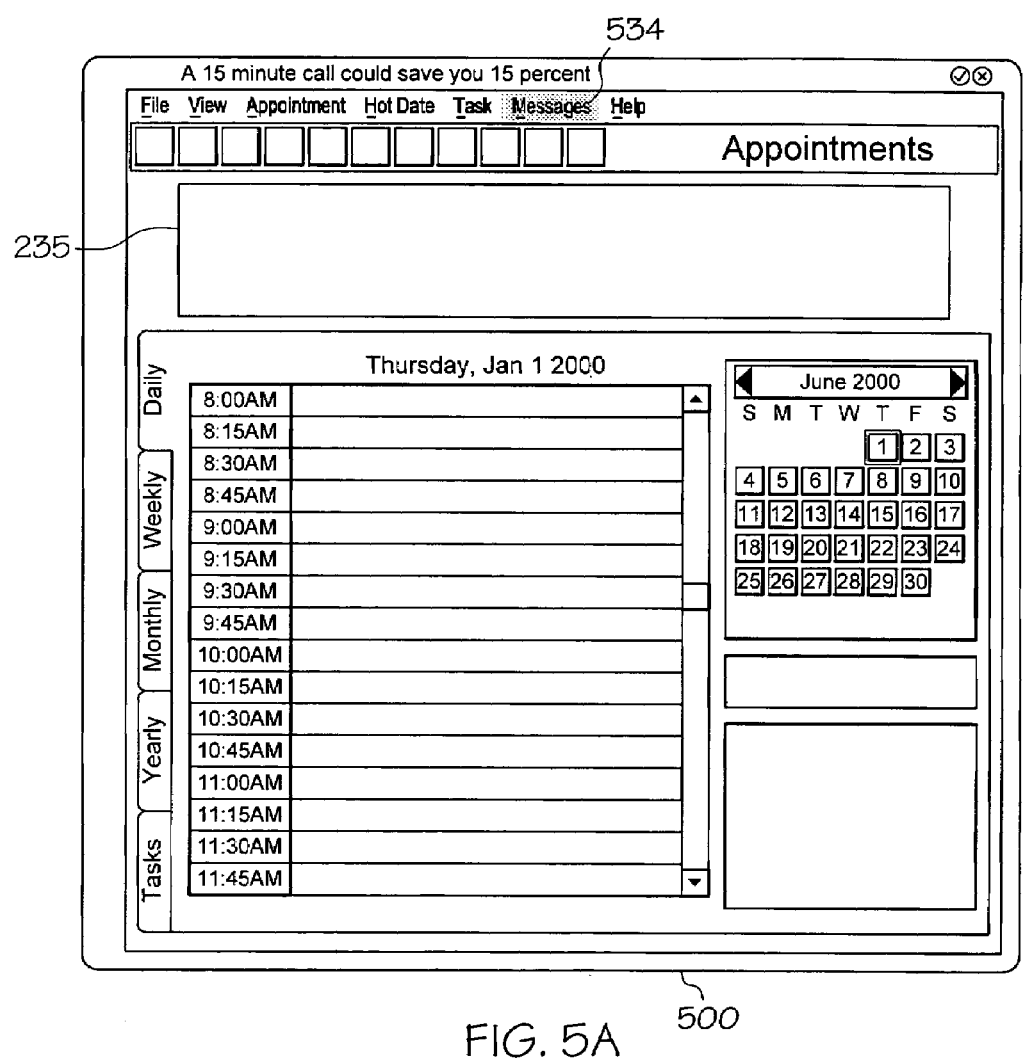
FIG. 5A is a screen shot of a frame displayed by the exemplary application in FIG. 5.
Figure 7:
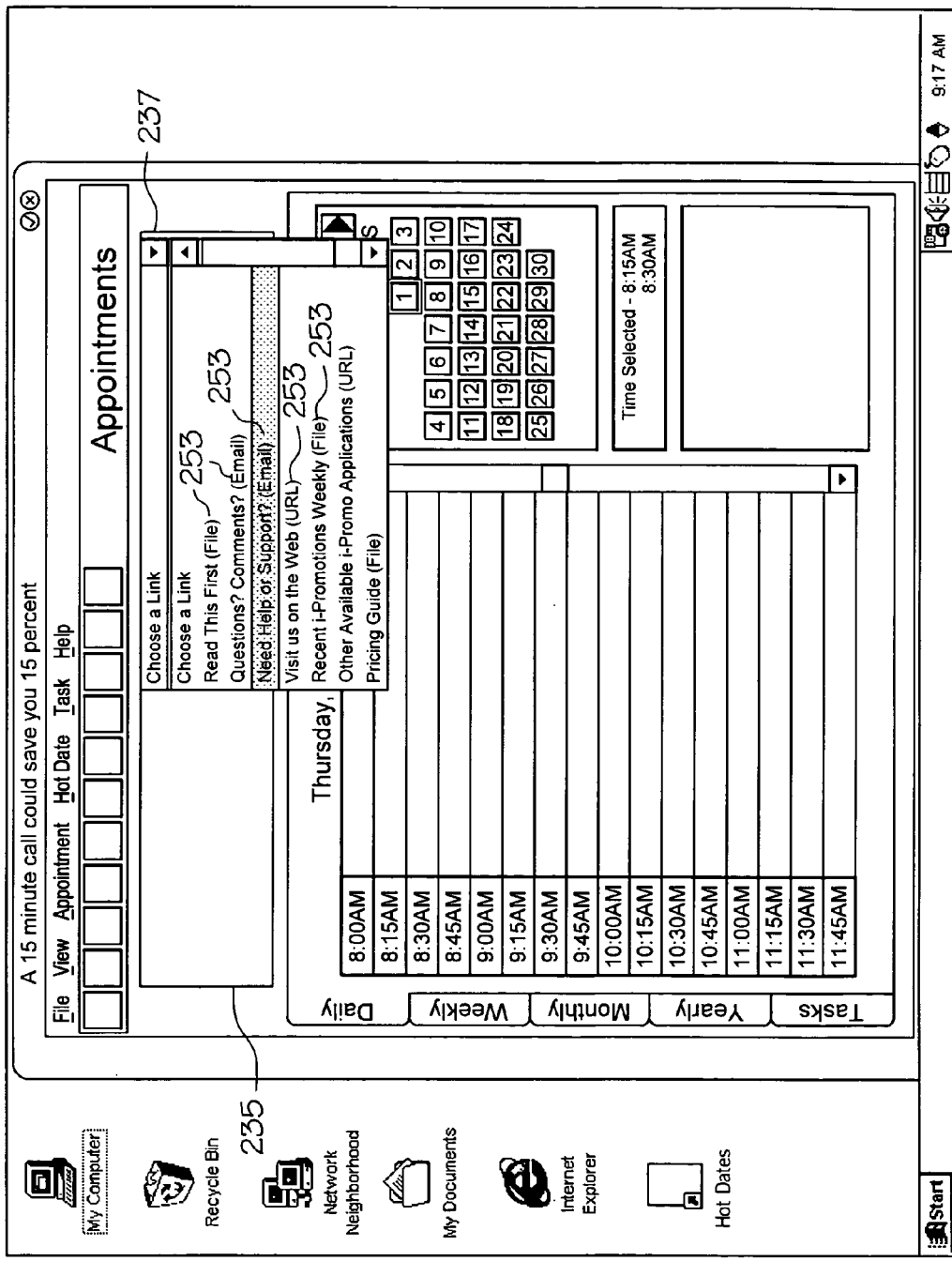
FIG. 7 is an illustration of a screen display of the pull down menu presenting advertising images and hotlink navigation options to the end-user consumer as the result of clicking on the banner in FIG. 5A.

FIG. 3 is a high level block diagram of the preferred architecture for the advertising module 210 of the present invention that resides on the advertising server 42. The advertising module 210 provides the key advertising display, end-user navigation and usage reporting functions of the invention. The advertising module 210 includes a communications interface 214 that allows the advertising module 210 to interact with a hosting application such as an HTML document. A graphical user interface 211 enables the advertising module to read an image file 212 and to display a banner image 235 to the consumer end-user on the screen of an end-user computer 14. The communications interface 214 also provides notification to the advertising module 210 from the hosting HTML document or application 220 of any consumer end-user actions upon the displayed banner image 235 (as illustrated in FIGS. 5A and 7), i.e., clicking or similar events. When an end-user clicks on a displayed banner image 235 of the present invention, the method of the present invention will cause the advertising module to read the data from the hotlink script 213 which contains the set of hotlink navigation options, specified by the advertiser when the advertising module was created.

Event recording code records consumer end-user events that are executed through the advertising module 210. The event and the date and time of the event is recorded and written to a usage data file 216 stored locally on the consumer's or end-user's PC 14 via a storage interface 215 in the advertising module 210 or the local event statistics database 40. An image file that is displayed by the advertising module 210 as the banner image 235 or banner ad (advertisement) displays a menu 237, illustrated in FIG. 7, having a set of hotlink navigation options 253 when the banner ad is clicked on or selected by the end-user.

The event and the date and time of the event that is recorded and written to a usage data file 216 is transmitted to a publisher's statistics database 48 on a statistics server 45 which is connected to the network 26 such as through the Web server 24 in FIG. 1. The usage data file 216 also includes a header to identify the end-user by a user identity number and demographic data which the end-user usually inputs such as area code and zip code, etc. An analysis program 44 on the statistics server 45 connected to the Web server 24 receives the information from the usage data file 216 and analyzes it and puts the results into the publisher's statistics database 48 for later access and use and reports by the advertiser. The analysis program 44 includes means for compiling summary information from the various usage data files 216 of different end-users and storing the compiled information is the publisher's statistics database 48.

The publisher computer 46, which is also typically a PC or personal computer, accesses the Web server 24, preferably through the network 26, to request statistical and other types of reports and other information about his end-users' behavior. These reports are produced by the analysis program 44 using the summary information and other data from the publisher's statistics database 48. Typically, the end-users are customers and potential customers of the publisher. The system, of course, may be used by many publishers for many different sets of end-users. The publisher's statistics database 48 and the analysis program 44 are preferably located on the statistics server 45 that is connected to the Web server 24 so that the publisher's statistics database 48 and the analysis program 44 can be accessed through the network 26.

An exemplary report screen 510 is illustrated in FIG. 8. The publisher's banner ad is identified by a publisher's product number "d-53". The report summarizes how many installations of the product or applications (such as the calendar application) have been recorded, denoted by "Products in Use"; how many times the banner ad 235 was viewed denoted, denoted by "Ad Views"; how many times the banner ad 235 was clicked on, denoted by "Ad Clicks"; and how many links or navigation options 253 were clicked on, denoted by "Links Clicked".

When the browser 8 is opened or invoked, the browser 8 tests for the presence of a network connection such as an Internet connection. If the browser 8 detects such a connection, it reads data from the usage data file 216 and formats the data for transmission to the remote Web server 24. The browser 8 then connects to the Web server 24 and transmits the data to the statistics server 45 connected to the Web server. The statistics server 45 inserts the newly transmitted end-user statistics data records into the publisher's statistics database 48. The statistics server 45 then transmits an operation complete flag back across the network to the browser 8. If the browser 8 doesn't detect such a connection, it will transmit the stored and un-transmitted end-user statistics data to the statistics server 45 for insertion into the publisher's statistics database 48, next time such a connection is detected.

Figure 4:
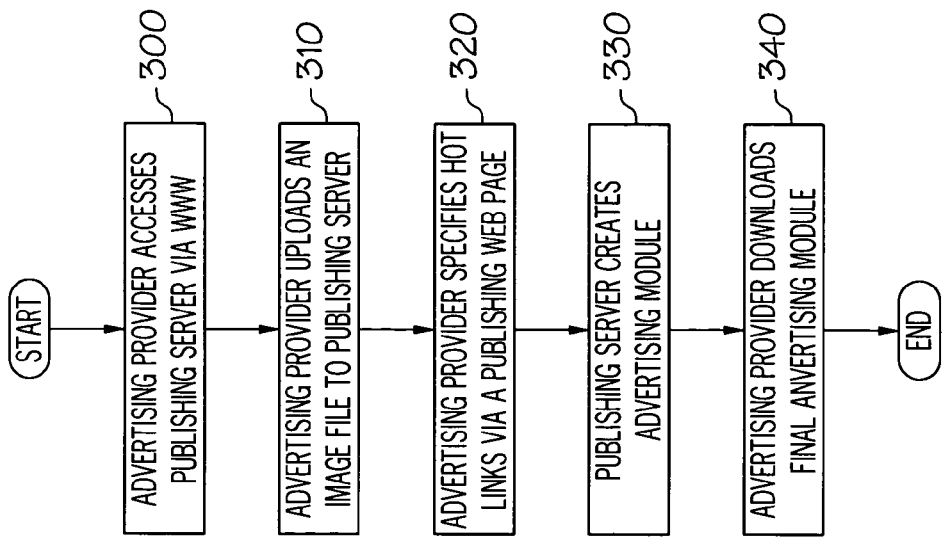
FIG. 4 is a flow diagram illustrating the process for a third party advertising producer to create and/or change a banner display of the banner software via an advertising module over a network.

The image file displayed by the advertising module as a banner ad and the set of hotlink navigation options presented when the banner ad is clicked on or selected by the consumer end-user is created and specified by the advertiser or publisher with the advertising module constructor 120 (the publishing software in the exemplary embodiment of the invention) which resides on the publishing server 110 through a series of simple, point and click operations. FIG. 4 is a flow diagram which illustrates an exemplary method of the current invention for the advertiser or publisher to produce the customized advertising module 210 through a series of simple steps that require no programming or interactive multi-media development skills. In the method, using an access step 300, the advertiser first establishes a connection with the publishing server 110 using the HTTP protocol over a TCP/IP network that is illustrated in FIG. 1.

Figure 4A:
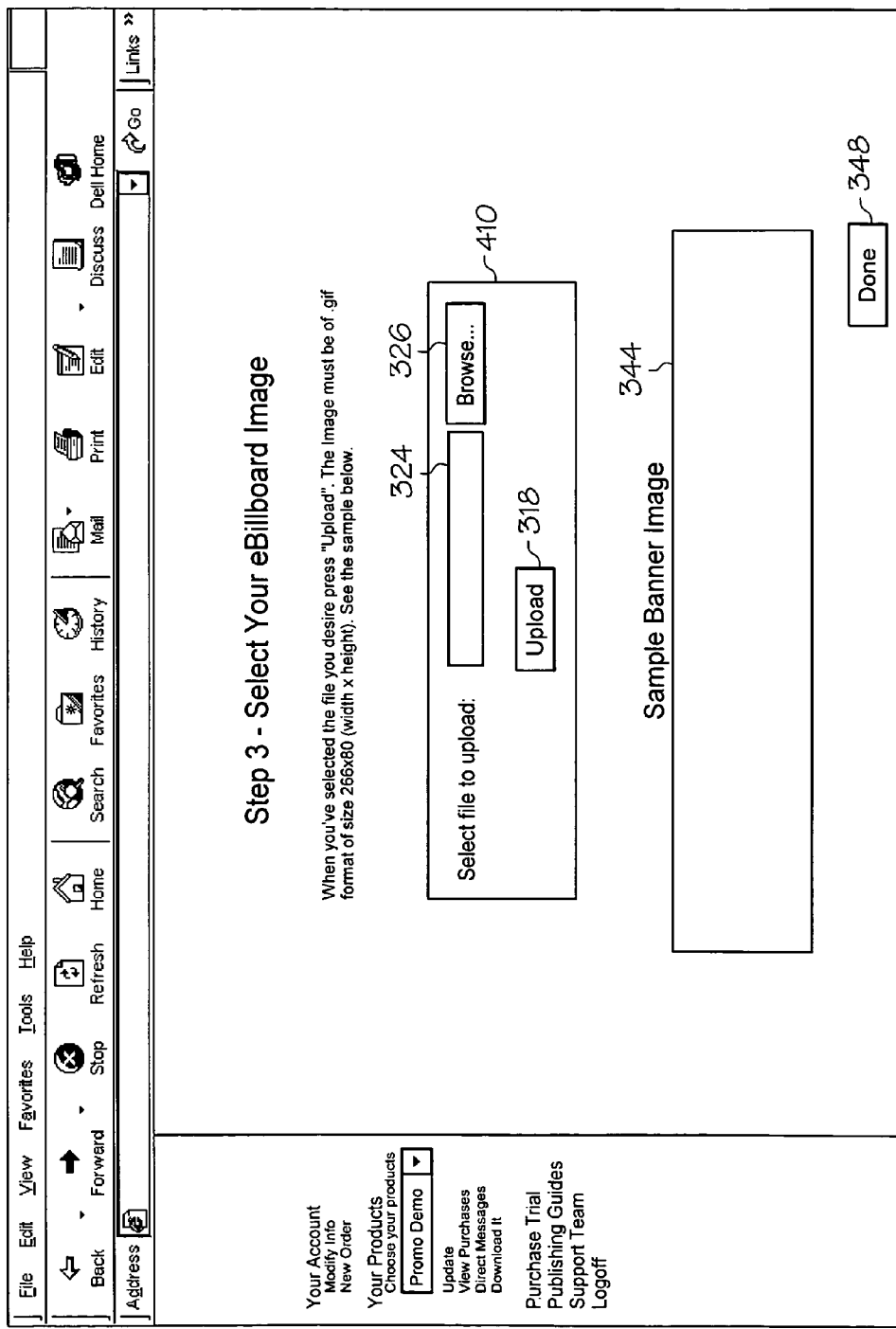
FIG. 4A is a first HTML page illustrating a screen used by the publisher to create the advertising module to select and upload a billboard image for the banner on the banner software.
Figure 4B:
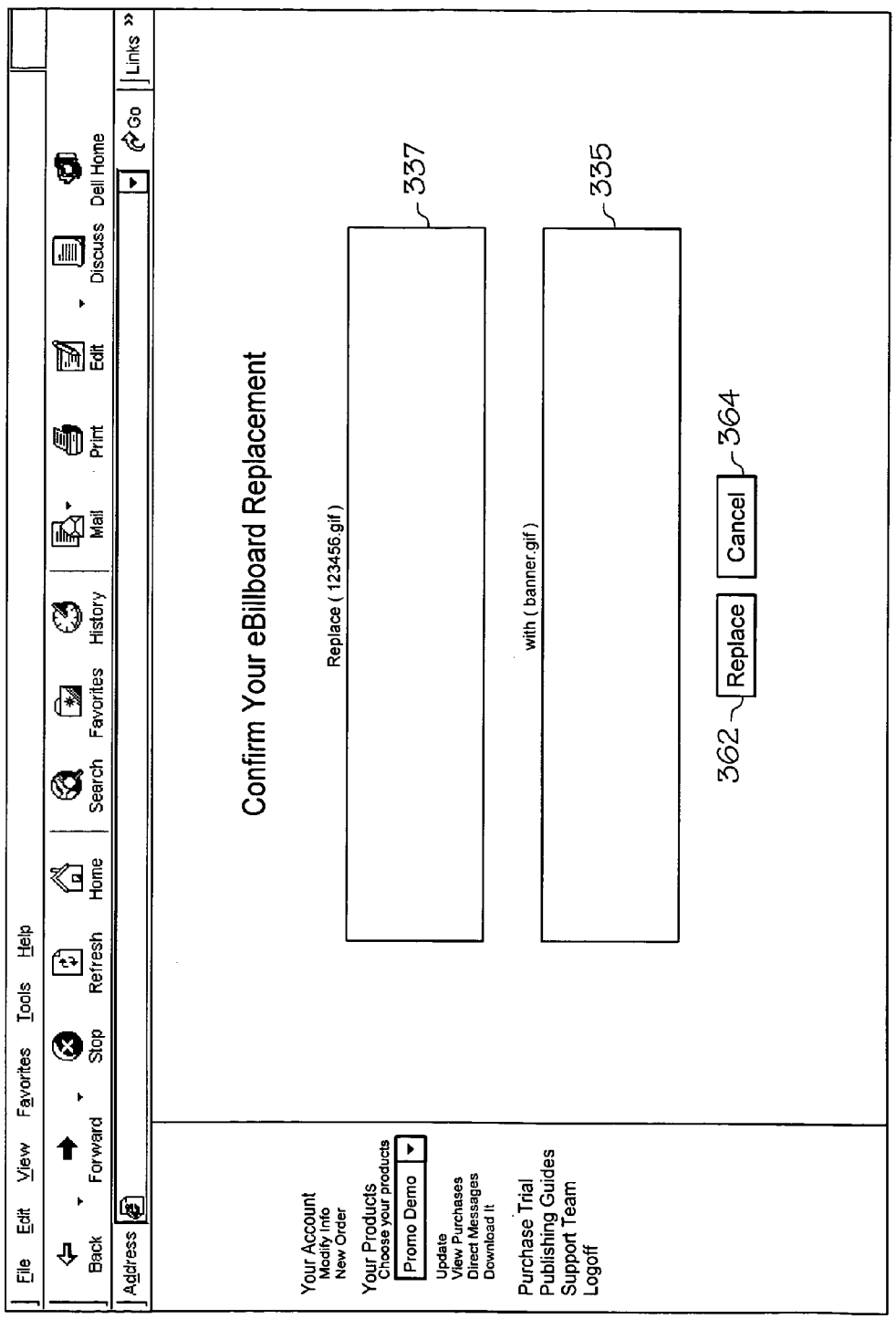
FIG. 4B is a second HTML page illustrating a screen used to confirm the publisher choice of the billboard image illustrated in FIG. 4A.

The publishing software provides a template input as illustrated in FIGS. 4A, 4B, and 4C, allowing the publisher to select various options or files to be stored on the advertising module 210. After the HTTP connection is established a banner image selection step 310 of the publishing software presents a banner image selection screen 315 illustrated in FIG. 4A to the advertiser or publisher via the advertiser's HTTP compliant client browser 130 on the publisher computer 46. The image selection screen is illustrated in the form of an HTML document. The advertiser then performs banner image selection step 310, using simple point and click operations, to select an image file which is used as the banner advertisement or the banner image 235 that is presented to consumers and end-users by the advertising module 210. As illustrated in FIG. 4A, a banner image file may be typed into the selection box 324 labelled "select file to upload" or a browse button 326 may be clicked on to browse for banner image file name to be selected for input. Selected banner images are uploaded by clicking on upload button 318 to be previewed in the sample banner image box 344. Once the image file is selected, the advertiser finalizes this step with a user interface command, clicking on a done button 348. The new or changed billboard 335 or banner choice or replacement is displayed together with the old billboard 337 or banner and confirmed as illustrated in FIG. 4B by clicking on the replace or cancel buttons 362 and 364, respectively. The selected image file is transmitted to the publishing server 110 where it is temporarily stored on the publishing server file system 112.

The next step in the method is specifying navigation option hotlinks 320, as illustrated in FIG. 4C, that the advertiser wants to associate with the banner advertisement image selected or installed in the previous step. The advertiser is presented with a second HTML document that permits the advertiser to specify what navigation option hotlinks he wants to associate with the banner advertisement image selected or installed previously. As illustrated with a screen in FIG. 4C, the advertiser is presented with choices to create the following types of navigation hotlinks: (i) a hyperlink to a URL specifying an HTML page on the World Wide Web; (ii) an E-mail address allowing the consumer quick access to E-mail accounts specified by the advertiser user; and/or (iii) the name and location of a file which can be accessed by the advertising module 210 on the end-user computer 14, or at some other location on the network. Other types of files or addresses on the network may also be used.

One way of choosing the navigation option is to use an input screen such as that illustrated in FIG. 4C. The advertiser specifies the desired navigation hotlinks by typing the text they wish presented to the end-user along with its associated URL, E-mail address or file name and location. E-mail options 430 allows advertisers to input under column marked display/name a description of an E-mail address and an associated E-mail address. File options 440 allows advertiser to input under column marked display/name a description of a file and a file location on the network including the consumer computer. URL options 450 allows advertiser to input under column marked display/name a description of URLs and associated URL addresses on the network. When the advertiser completes this step with a user interface command, the publisher server then begins the process of creating the final advertising module 210, illustrated in FIG. 2, customized according to the choices made by the advertiser.

The advertiser specifies the desired navigation hotlinks by simply typing the text they wish to present to the end-user along with its associated URL, E-mail address or file name and location. When the advertiser end-user indicates that they have completed this step by a simple user interface command, the publisher server then creates 330 the final advertising module 210, illustrated in FIG. 2, customized according to the choices made by the advertiser as entered into the template in the screens described above. When the customized advertising module 210 is completed, it is automatically downloaded 340 and made ready for use by the advertising server 42 via an HTTP download of the module and its associated files to the advertising server 42 where it is written to the advertising server file system 160 of the advertising server 42.

The banner ad may be updated in the same way resulting in a new or an updated customized advertising module 210. The browser 8 or an advertising module 210 stored on the end-user computer 14 as stand alone or in the banner software 6 includes software for detecting a network connection and executing a transaction with a network server to determine if at least one of the banner ads and/or the navigation options should be updated. If the software finds there is an updated customized advertising module 210 it is uploaded to the end-user computer 14. The browser 8 and/or the banner software 6 also alters the appearance of the icon 50 on the screen 52, such as by changing its color or highlighting it, to alert the user that banner ad has been updated or changed. The entire system of producing and maintaining the advertising modules 210 for all of the end-users associated with or the customers of the publisher or advertiser may be sold or otherwise transferred to another publisher or advertiser. This would include ownership or rights to the publisher's statistics database 48 on a statistics server 45. If this happens, a new icon 50 may be placed on all of the browsers 8 for display on the screens.

The advertising module 210 is available to be accessed by the consumer across the network when the consumer clicks on the banner 410. In one embodiment of the invention, the advertising module 210 is embedded by the advertiser in an HTML page, or other software or multi-media application. In a more particular embodiment of the invention, the advertising module 210 is embedded by the advertiser in an HTML page, or other software or multi-media application that supports object embedding of Microsoft ActiveX controls and/or Java applets. Illustrated in FIG. 5 is an application icon 50 labelled hot dates, in a Microsoft Windows Desktop screen 52, for launching an exemplary stand alone calendar application having a customized advertising module for displaying an exemplary banner ad of the present invention. FIG. 5A is a screen shot of a frame 500 displayed by the exemplary calendar application with the customized advertising module for displaying an exemplary banner ad 235 of the present invention.

Figure 6:
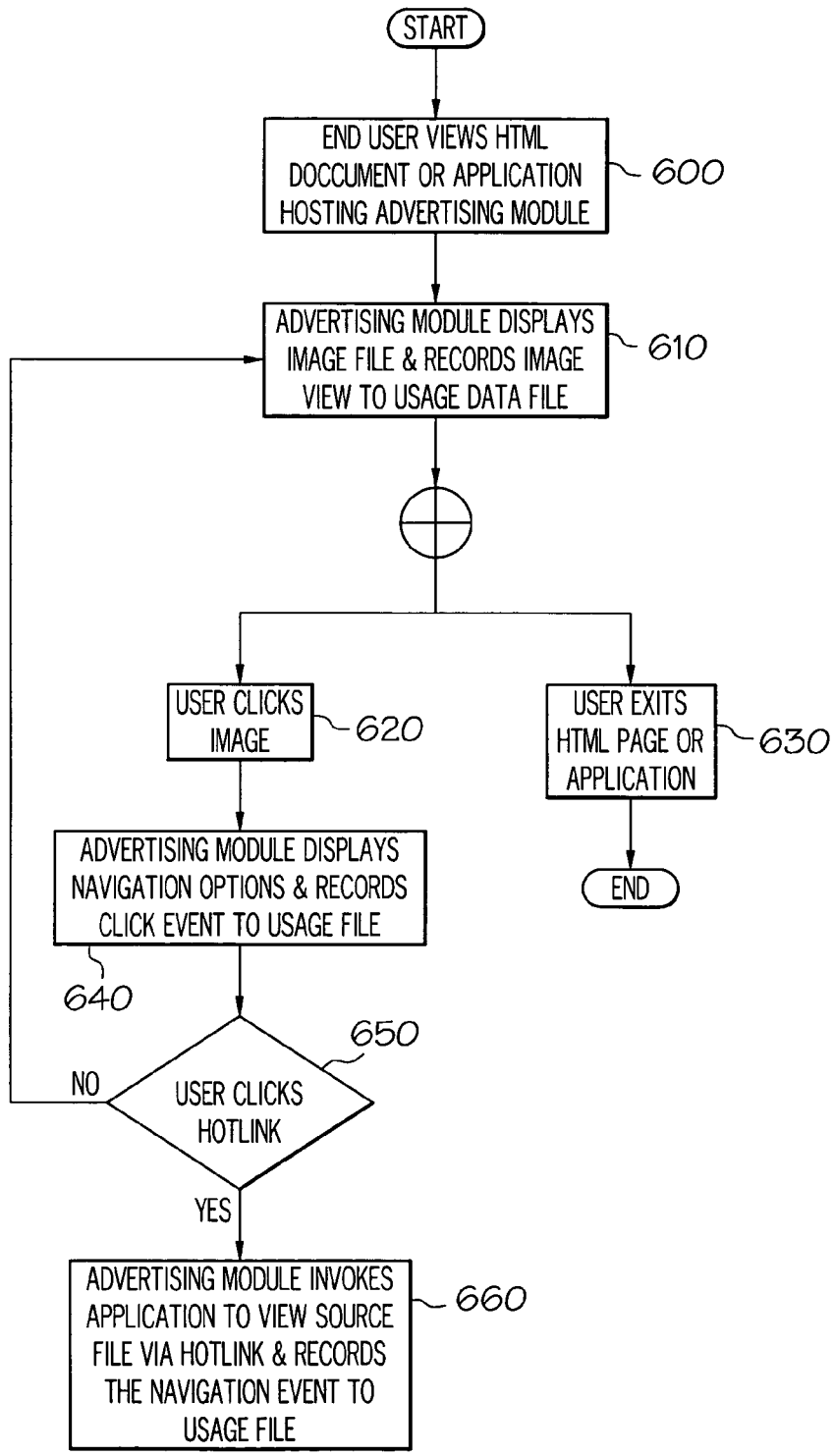
FIG. 6 is a flow diagram of an exemplary process of the current invention illustrating how an advertising module interacts with an end-user consumer to display an advertising image, accept user click actions, and open files and/or hyperlinks presented to the user via the advertising module.

FIG. 6 illustrates a flow diagram of one method of the current invention for the operation of the advertising module 210 interacting with the consumer end-user on the end-user computer 14. An HTML compliant application residing on the consumer end-user computer 14 is viewed 600 and used to invoke the hosted advertising module 210. Once the advertising module 210 is invoked, it presents or displays 610 the banner ad or banner image 235 to the end-user. When the image file is presented, the advertising module makes a record of the display event and the date/time and writes this data to the local event statistics database 40 or the separate usage data file 216 located and stored locally on the consumer end-user computer 14.

At this point, if the consumer end-user terminates 630 the browser or application hosting, the advertising module or otherwise fails to click 620 or select the displayed banner ad image, no other operations occur. If the consumer end-user clicks 620 on or otherwise selects the displayed banner ad image 235, then the advertising module responds by displaying 640 a drop down menu 237 superimposed over the banner ad image on the consumer end-user computer display. In addition, the advertising module will make a record of the click event and the date/time and will write this data to the usage data file 216 stored locally on the consumer or end-user computer 14.

When presented with the drop down menu of hotlink navigation options, the consumer end-user may elect to click-on a hotlink 650, or otherwise select, any one of the displayed hotlinks. When a hotlink is clicked, the advertising module invokes an application 660 which reads and parse a locally stored hotlink script to determine what action to take in response to the end-user's selection. Based upon the type of hotlink selected by the consumer end-user, the advertising module might cause any one of the following processing operations to occur: (i) invoke the default Web browser installed on the end-user computer and direct the Web browser to load the URL specified by the hotlink; (ii) invoke an E-mail client module incorporated as part of the advertising module and fill in the "TO" E-mail address specified in the hotlink; or (iii) invoke the software application required to view a file of the type specified in the hotlink if an appropriate software application is installed locally on the consumer end-user's computer. For example, if a hotlink is associated with and Adobe PDF, then the advertising module would attempt to locate and run Adobe's Acrobat Reader application to present the PDF file to the consumer end-user.

If the consumer end-user clicks on any of the displayed hotlink navigation options, then the advertising module invokes the second application 660 that records the click event, the URL, E-mail address, or file name of the selected link, the date/time and writes this data to the locally stored usage file.

The flow chart diagram in FIG. 6 illustrates the software operation related to sample screen shots in FIGS. 5A and 7 as it appears to the consumer end-user on a screen of the end-user computer 14. FIG. 5A is a screen shot illustration of how the advertising module 210 displays the banner image 235, also referred to as the banner ad, on the screen. In the depicted embodiment, the advertising module is displaying the banner image file 235 to the end-user hosted in a stand alone calendar application. In an alternative embodiment, the advertising module might be embedded in an HTML document, or related document, which supports embedding either ActiveX controls or Java applets or on a Web site on the Internet.

FIG. 7 presents a screen shot depicting the display of the calendar application in the frame 500 with the advertising module 210 after the consumer or end-user clicks on the displayed banner image 235 in the frame 500 displayed in FIG. 5A. The drop down menu 237 appears to the end-user listing the various hotlink navigation options 253 specified by the advertiser user when the advertising module was created. By clicking on any of the displayed hotlink options, the end-user will cause the advertising module to invoke a software application, such as a Web browser, that will then display the file, Web page or E-mail address associated with the navigation option selected by the consumer end-user.

Figure 9:
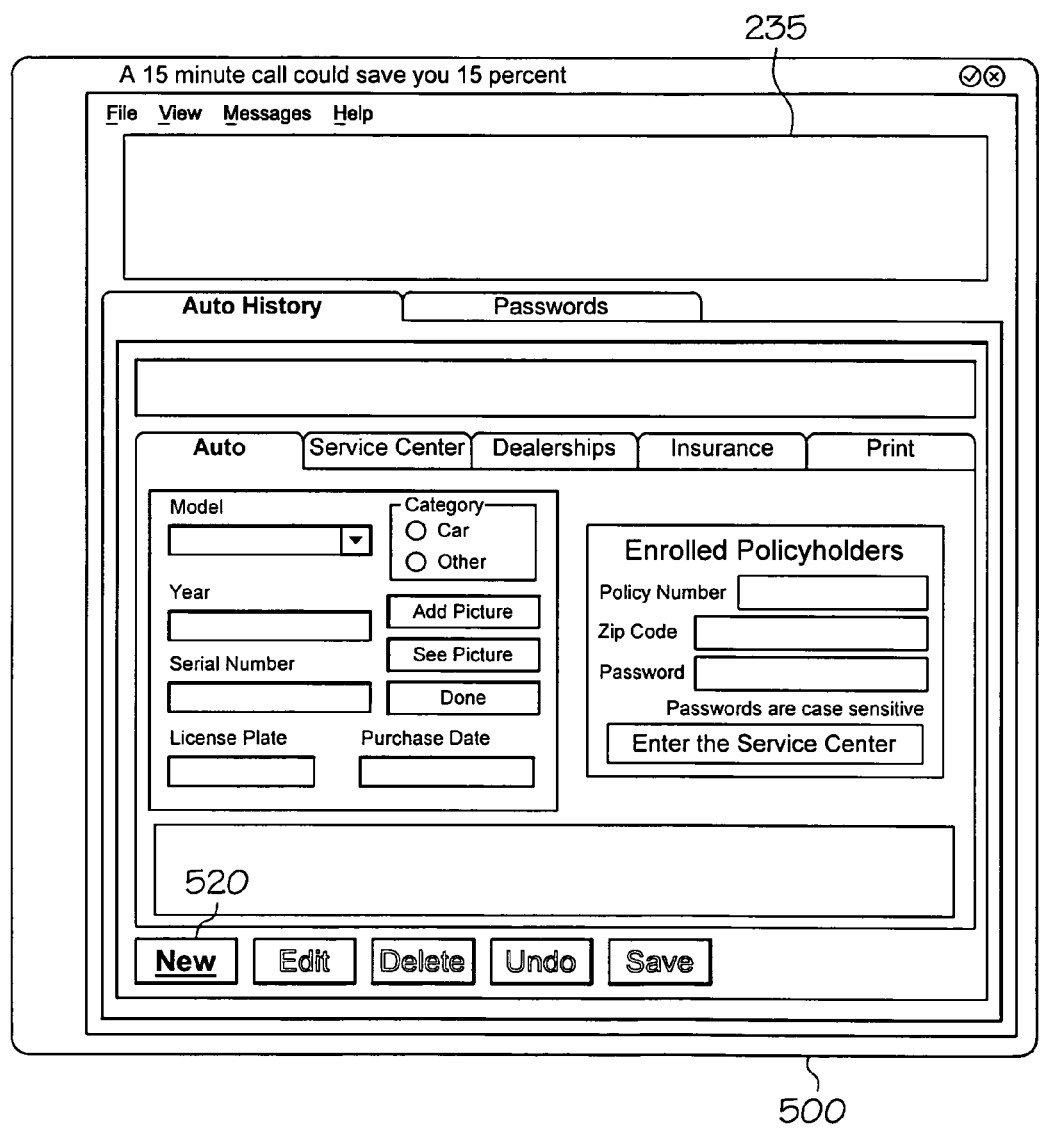
FIG. 9 is an illustration of a screen display of a frame displayed by a second exemplary application for automobile maintenance.
Figure 10:
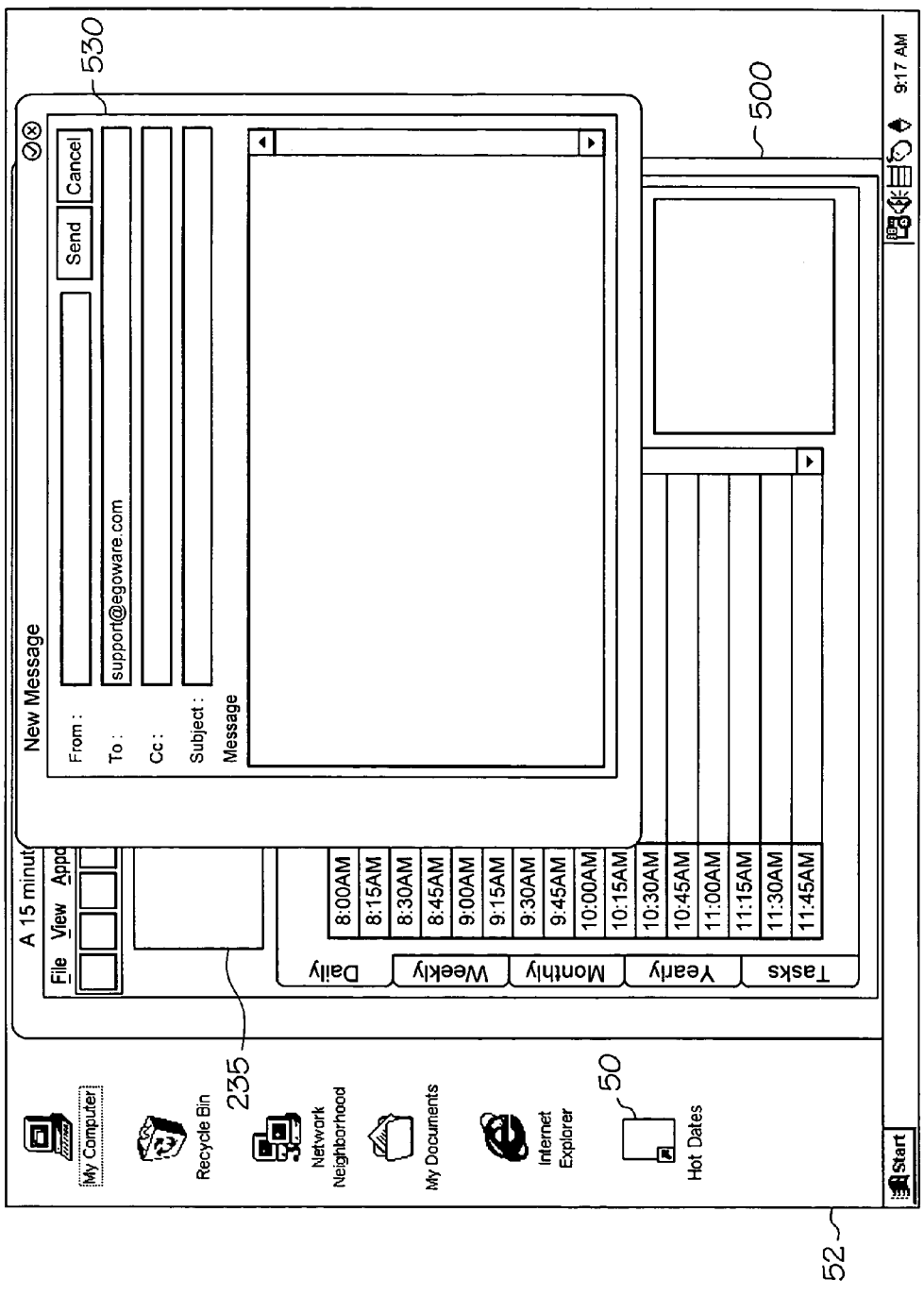
FIG. 10 is an illustration of a screen display of a message frame displayed over the banner in FIG. 5A.

Another feature of the present invention is messaging software and system for sending targeted messages 530 as illustrated in FIG. 10 to all or some of the end-users of the banner software 6. The publisher can send a message to some or all of the end-users that have installed the publisher's banner software 6 in the advertising module 210 sent to and installed by the end-user on the end-user computer 14. The end-user is alerted to a message sent by the publisher to the end-user with an alert which is illustrated in one exemplary form in FIG. 9 as a message alert 520 which is the button labelled New being highlighted in the frame 500 displayed by a second exemplary application. The application illustrated in FIG. 9 is for automobile maintenance as may be distributed by an insurance company as the publisher. The frame 500 contains the customized advertising module for displaying an exemplary banner ad 235 of the present invention. The highlighted New also serves a link to the new message.

The end-user can display the message 530 by clicking on the alert 520, the highlighted link New, which will bring up the new message 530 in a frame labelled messages as illustrated in FIG. 10 for the exemplary calendar application illustrated in FIG. 5A. The software can also bring up a frame containing a listing of and a link to all new messages since last viewed and optionally all old messages that had been previously viewed. Alternatively, the banner software 6 also can alter the appearance of the application icon such as the application icon labelled hot dates in FIG. 5 such as by changing its color, highlighting it, or changing its shape such as to a mail box. The banner software 6 then returns the appearance of the icon that appears on the screen to an unaltered appearance after the message has been displayed on the screen. The unaltered appearance is the same appearance the icon had before its appearance was altered. The feature of changing the appearance of the icon can used for any type of alerting and the icon can be other types of icons that appear on a screen such as the customized browser icon 50. Alerting by changing an icon appearance can be used for alerting used about new E-mail or changes to the publisher content 31. Alternatively, the banner software can automatically display the new message automatically when the end-user logs on to the network or invokes the banner ad software 6 which causes the banner ad to be displayed. The message alert can also be a message button 534 labelled Message and being highlighted in the frame 500 displayed by the exemplary calendar application together with the customized advertising module for displaying an exemplary banner ad 235 of the present invention as illustrated in FIG. 5A. The highlighted message button 534 also serves a link to the new message.

Figure 11:
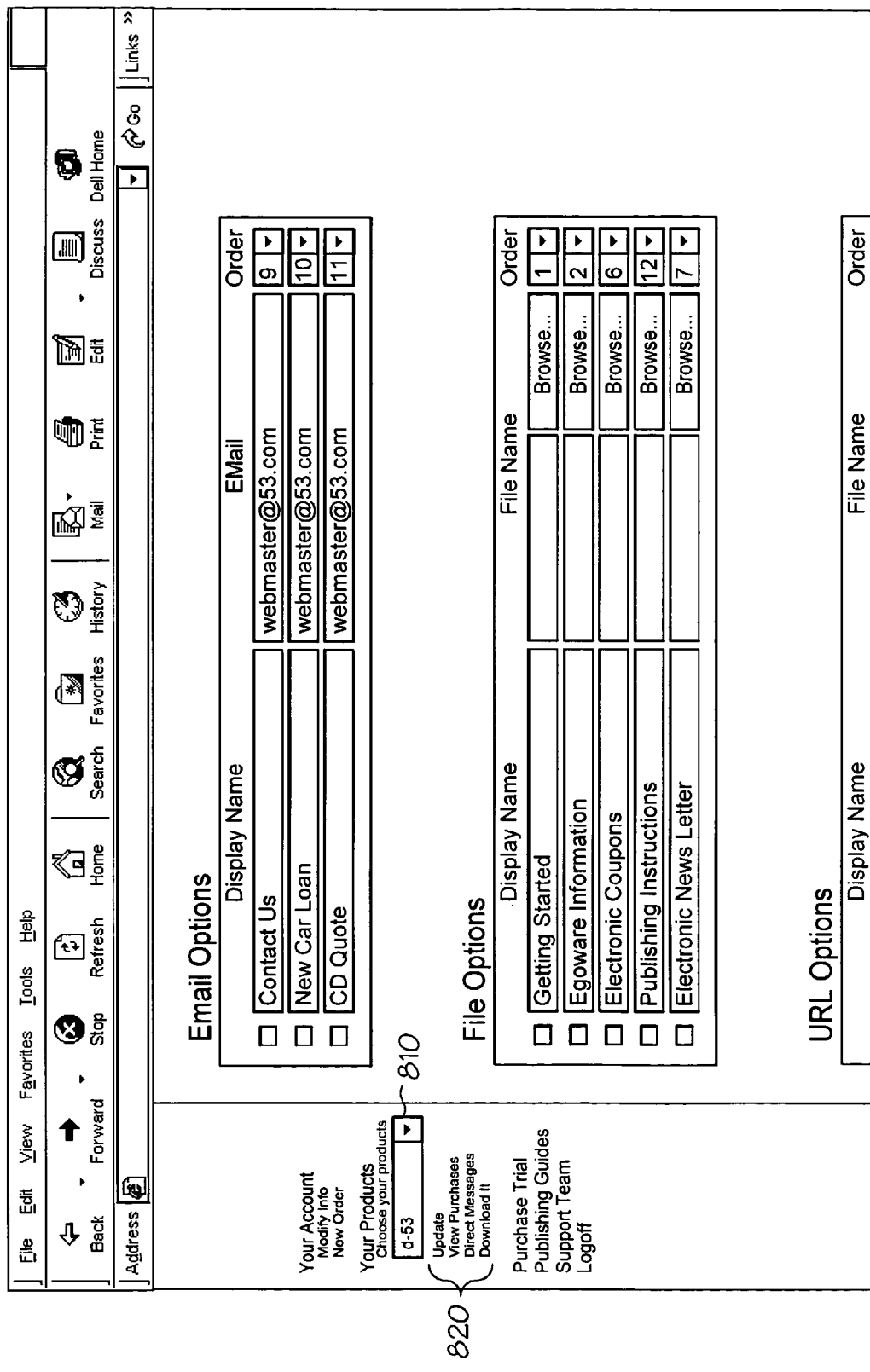
FIG. 11 is an illustration of a publishing screen of the advertising module constructor.

The directed messages are loaded and directed by the advertiser or publisher with the advertising module constructor 120 which resides on the publishing server 110 through a series of simple, point and click operations. Once the publisher logs on to the advertising module constructor 120, he is presented with a publishing screen 800 illustrated in FIG. 11 and a choice of products 810. Each publisher may have one or more products or banner ads out on different end-user computers connected or connectable to the network. Choices 820 are presented in the screen for updating content of the banner ad, viewing statistics or statistical reports such as in the exemplary report screen 510 illustrated in FIG. 8, sending a directed message to end-user computers that have the banner ad software 6 loaded indicated by the product d-53, and finally downloading changes to the product or the direct message. Options for updating the content are shown also illustrated as E-mail options, File options, and Url options. The targeted message is created and distributed to the designated recipients or end-users by a targeting code invoked by clicking on the Directed Messages link presented in the choices 820. The E-mail options include one or more E-mail addresses to send E-mail and clicking on the an E-mail option presents the end-user with an E-mail screen having entry fields for messages and attachments and are addressed to the E-mail address listed in the menu.

Figure 12A:
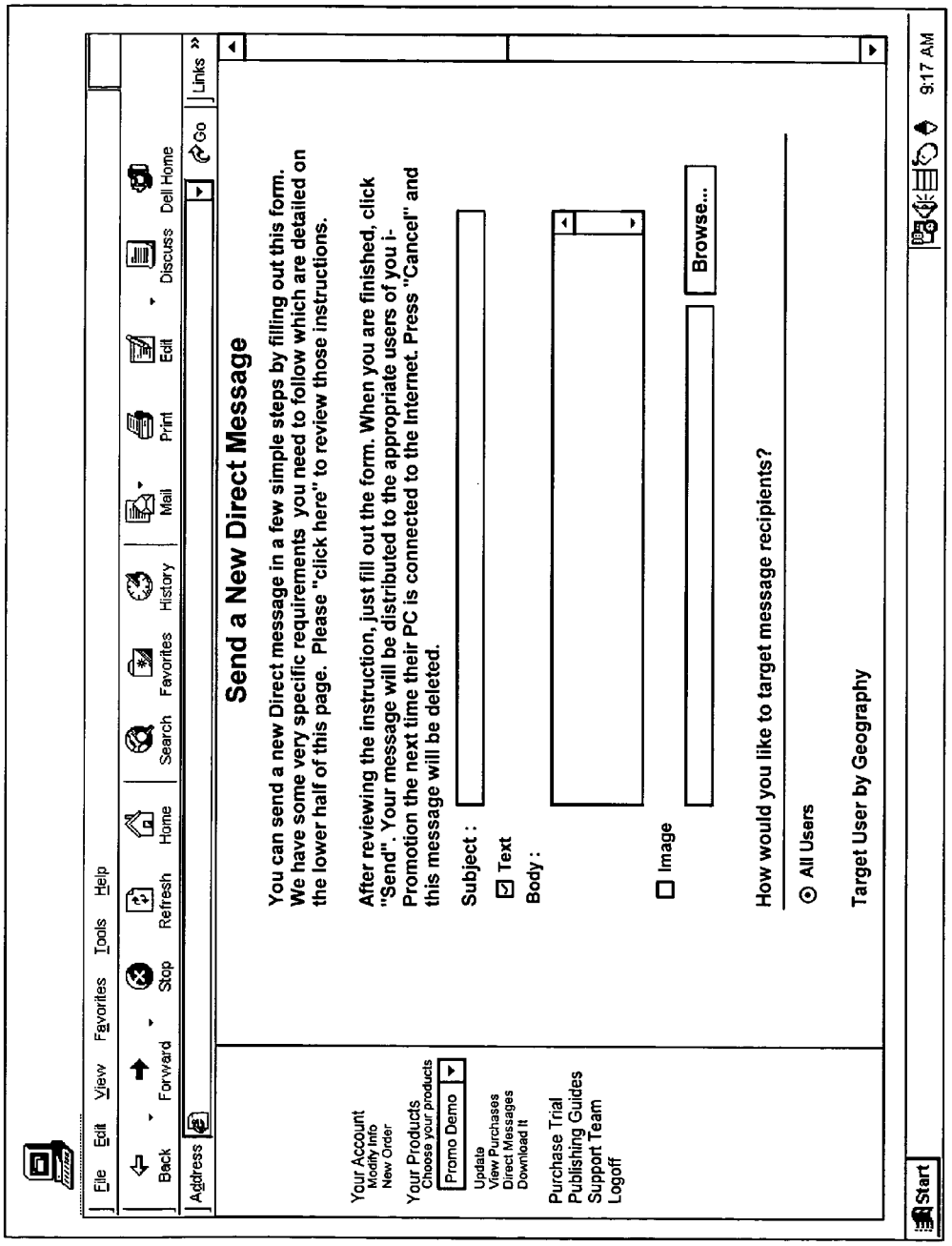
FIG. 12A is an illustration of a top portion of a screen of the advertising module constructor for inputting and sending directed messages to end-user computers.
Figure 12B:
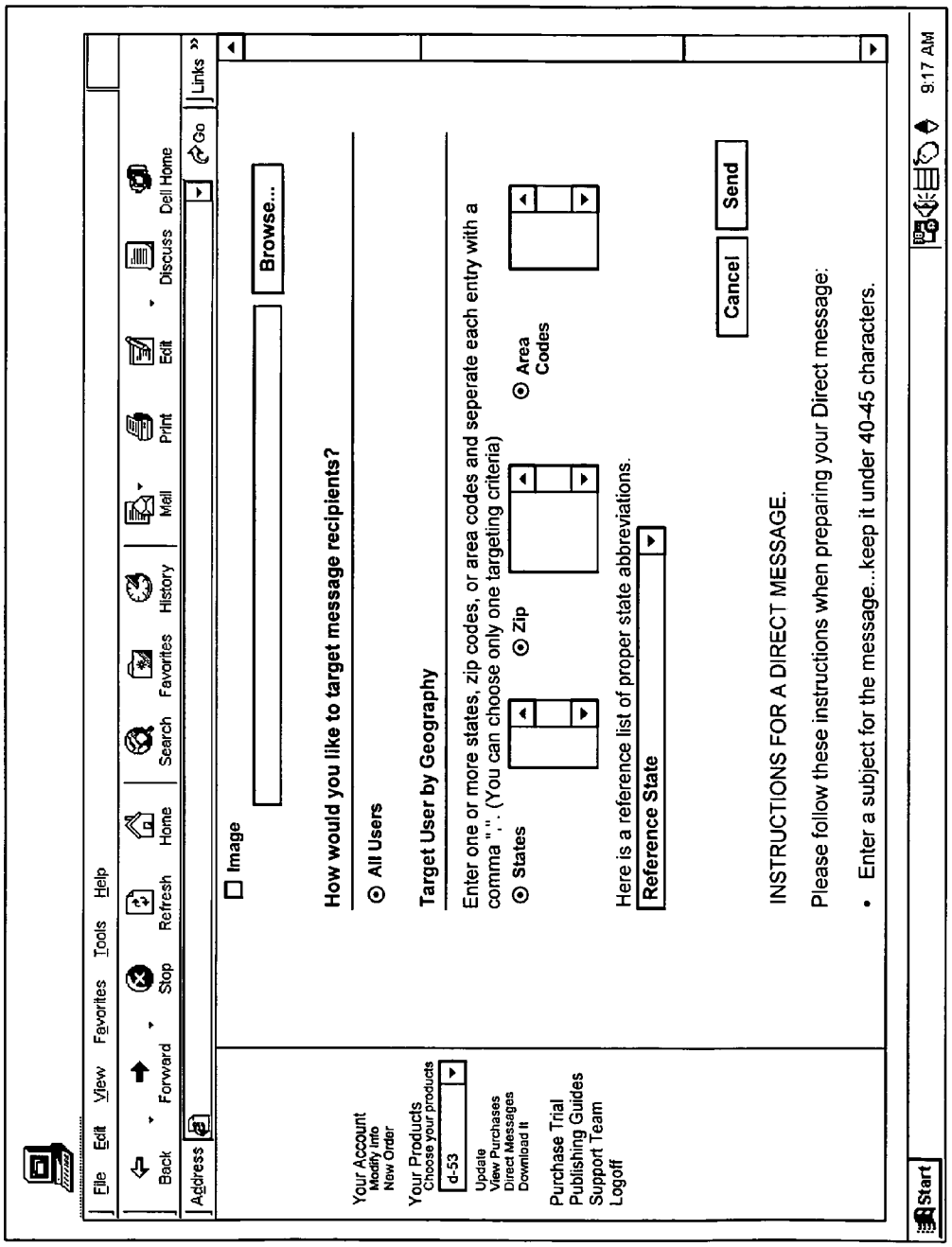
FIG. 12B is a middle portion of the screen in FIG. 12A illustrating inputting and sending directed messages to end-user computers.
Figure 13:
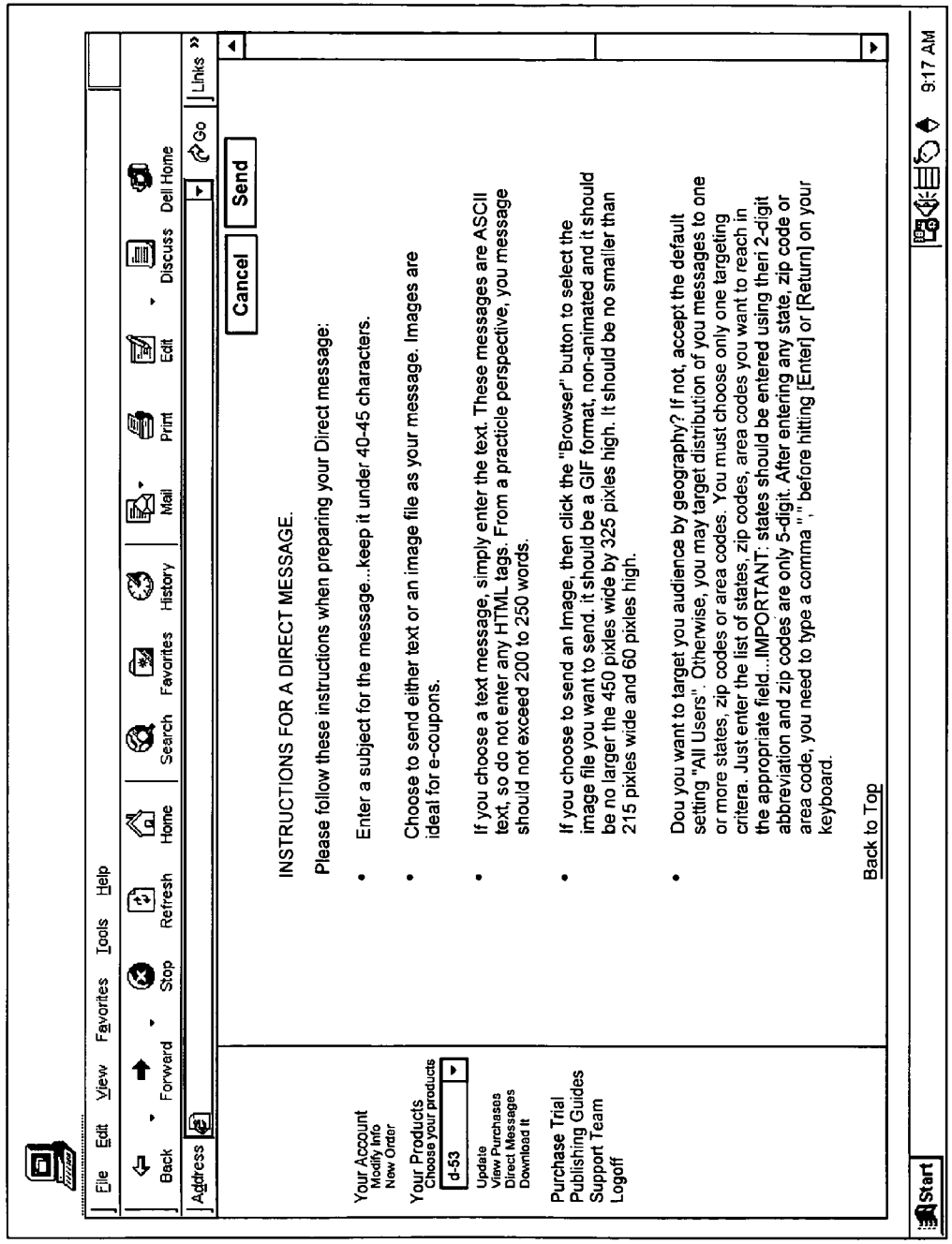
FIG. 13 is a bottom portion of the screen in FIG. 12A illustrating instructions for filling out forms in FIGS. 12A and 12B.

Clicking on the Directed Messages link presents the publisher with a proscribed template or form illustrated in FIGS. 12A and 12B which in the exemplary embodiment appear on a single screen. Instructions for filling out the form are illustrated in FIG. 13. As can be seen from the instructions in FIG. 13 taken in conjunction with form in FIGS. 12A and 12B, the publisher enters a subject for the message and to send either text, the body of which is the message, and/or an image file as the message file. Images are typically used for coupons or e-coupons as they may be called. If a text message is chosen, it is entered as text and may be typed in or copied from another electronic document. The messages are illustrated as being ASCII text. If an image is chosen, then the publisher clicks the 'Browse' button to select the image file to be sent. It could be in a specified type of format or formats such as a GIF format and specified size.

The message can be targeted by geography or other demographic data collected from the end-users and stored in the publisher's statistics database 48 on a statistics server 45. Such targeting is illustrated by options in FIG. 12B as states, zip codes or area codes.

What is claimed is:

1. Banner software stored in computer readable medium comprising:
   a banner display means for displaying a banner on a screen on an end-user computer,
   said banner display means having a menu display means for presenting a menu of navigation options when an end-user clicks on said banner, and
   at least a portion of said navigation options are URLs on a network to which end-user computer is connectable.

2. Software as claimed in claim 1 further comprising a means for monitoring end-user's behavior regarding accessing said banner, a means for maintaining a local event statistics database of said end-user's behavior regarding accessing said banner, and a means of transmitting information in said local event statistics database to a server computer on said network.

3. Software as claimed in claim 2 wherein said local event statistics database includes number of times said banner was accessed by the end-user.

4. Software as claimed in claim 3 wherein said local event statistics database further includes URLs on a network to which end-user computer has been directed through a choice from said menu of navigation options.

5. Software as claimed in claim 2 further comprising nested menus in said menu of navigation options.

6. Software as claimed in claim 2 further comprising cascading menus in said menu of navigation options.

7. Software as claimed in claim 1 wherein said options further include one or more addresses to files stored on fixed storage means for fixedly storing files on the end-user computer.

8. Software as claimed in claim 7 wherein said fixed storage means include hard drives and CD-ROM drives.

9. Software as claimed in claim 1 further comprising a means for detecting a network connection and executing a transaction with a network server to determine if at least one of said banner and said navigation options should be updated.

10. Software as claimed in claim 9 further comprising a means for updating said banner and said navigation options.

11. Software as claimed in claim 10 further comprising a means for monitoring end-user's behavior regarding accessing said banner, a means for maintaining a local event statistics database of said end-user's behavior regarding accessing said banner, and a means of transmitting information in said local event statistics database to a server on said network.

12. Software as claimed in claim 11 wherein said local event statistics database includes number of times said banner was accessed by the end-user.

13. Software as claimed in claim 12 wherein said local event statistics database further includes URLs on a network to which end-user computer has been directed through a choice from said menu of navigation options.

14. Software as claimed in claim 13 wherein said options further include one or more addresses to files stored on fixed storage means for fixedly storing files on the end-user computer.

15. Software as claimed in claim 14 wherein said fixed storage means include hard drives and CD-ROM drives.

16. Software as claimed in claim 8 further comprising a means for updating said banner and said navigation options.

17. Software as claimed in claim 16 further comprising a means for monitoring end-user's behavior regarding accessing said banner, a means for maintaining a local event statistics database of said end-user's behavior regarding accessing said banner, and a means of transmitting information in said local event statistics database to a server on said network.

18. Software as claimed in claim 17 wherein said local event statistics database includes number of times said banner was accessed by the end-user.

19. Software as claimed in claim 18 wherein said local event statistics database further includes URLs on a network to which end-user computer has been directed through a choice from said menu of navigation options.

20. Software as claimed in claim 1 further comprising a banner updating means for allowing a publisher to change said navigation options.

21. Software as claimed in claim 20 further comprising a means for monitoring end-user's behavior regarding accessing said banner, a means for maintaining a local event statistics database of said end-user's behavior regarding accessing said banner, and a means of transmitting information in said local event statistics database to a server on said network.

22. Software as claimed in claim 21 wherein said local event statistics database includes number of times said banner was accessed by the end-user.

23. Software as claimed in claim 22 wherein said local event statistics database further includes URLs on a network to which end-user computer has been directed through a choice from said menu of navigation options.

24. Software as claimed in claim 23 further comprising nested menus in said menu of navigation options.

25. Software as claimed in claim 23 wherein said options further include one or more addresses to files stored on fixed storage means for fixedly storing files on the end-user computer.

26. Software as claimed in claim 25 wherein said fixed storage means include hard drives and CD-ROM drives.

27. Software as claimed in claim 26 further comprising a means for detecting a network connection and executing a transaction with a network server to determine if at least one of said banner and said navigation options should be updated.

28. Publishing software for producing and changing banner software for displaying banners, said publishing software stored in a server computer accessible via a network, said publishing software comprising:

a means for selecting navigation options for the banner software, wherein the banner software is in machine readable format having a banner display means for displaying a banner on a screen on an end-user computer, said banner display means having a menu display means for presenting a menu of navigation options when an end-user clicks on said banner, and at least a portion of said navigation options are URLs on a network to which the end-user computer is connectable, and a means for storing the banner software for distribution to the end-user computer.

29. Software as claimed in claim 28 wherein said options further include one or more addresses to files stored on fixed storage means for fixedly storing files on the end-user computer.

30. Software as claimed in claim 29 wherein said options further include one or more E-mail addresses to send E-mail.

31. Software as claimed in claim 28 further comprising a banner selection means for selecting a banner image file for the banner display means to display as the banner.

32. Software as claimed in claim 28 further comprising an installation means for installing the banner software in an application.

33. Software as claimed in claim 28 further comprising an updating means for changing the banner software in an application.

34. Software as claimed in claim 33 further comprising an alerting means for alerting the end-user that the banner software has been changed on the end-user computer.

35. Software as claimed in claim 34 wherein said alerting means alters appearance of an icon on a screen of the end-user computer that invokes the banner software when the icon is clicked upon.

36. Messaging software for producing and sending a message that appear of the screen of end-user computers that have banner software installed on the end-user computers, said messaging software stored in a server computer accessible via a network, said messaging software comprising:

a means for inputting the message to be transmitted to and displayed on the end-user computers, said banner software is in machine readable format having a banner display means for displaying a banner on a screen on an end-user computer, said banner display means having a menu display means for presenting a menu of navigation options when an end-user clicks on said banner, and at least a portion of said navigation options are URLs on a network to which the end-user computer is connectable, and a means for displaying the message when the banner is displayed on a screen on an end-user computer.

37. Software as claimed in claim 36 further comprising an alerting means for alerting the end-user that the message has been sent to the end-user computer.

38. Software as claimed in claim 37 wherein said alerting means alters appearance of an icon on a screen of the end-user computer.

39. Software as claimed in claim 37 wherein said alerting means causes a button to be displayed or alters appearance of the button on a screen of the end-user computer.

40. Publishing software for producing and changing banner software, said publishing software stored in a server computer accessible via a network, said publishing software comprising:

a template means for selecting navigation options for the banner software, wherein the banner software is in machine readable format having a banner display means for displaying a banner on a screen on an end-user computer, said banner display means having a menu display means for presenting a menu of navigation options when an end-user clicks on said banner, and at least a portion of said navigation options are URLs on a network to which the end-user computer is connectable, a means for storing the banner software on the server computer, and a means for distributing the banner software from the server computer to said end-user computer.

41. A banner display system comprising:

at least one end-user computer connectable to a network, banner software stored on said end-user computer in machine readable format, said banner software comprising;
a banner display means for displaying a banner on a screen on an end-user computer,
said banner display means having a menu display means for presenting a menu of navigation options when an end-user clicks on said banner, and
at least a portion of said navigation options are URLs on said network to which end-user computer is connectable.

42. A system as claimed in claim 41 further comprising a means for monitoring end-user's behavior regarding accessing said banner, a means for maintaining a local event statistics database of said end-user's behavior regarding accessing said banner, and a means of transmitting information in said local event statistics database to a server on said network.

43. A system as claimed in claim 42 wherein said local event statistics database includes number of times said banner was accessed by the end-user.

44. A system as claimed in claim 43 wherein said local event statistics database further includes URLs on a network to which end-user computer has been directed through a choice from said menu of navigation options.

45. A system as claimed in claim 44 wherein said options further include one or more addresses to files stored on fixed storage means for fixedly storing files on said end-user computer.

46. A system as claimed in claim 45 wherein said fixed storage means include hard drives and CD-ROM drives.

47. A system as claimed in claim 45 further comprising a means for detecting a network connection and executing a transaction with a network server to determine if at least one of said banner and said navigation options should be updated.

48. A system as claimed in claim 47 further comprising a means for updating said banner and said navigation options with updates sent to said end-user computer from said server.

49. A banner display publishing system comprising:
a publishing server connected to a network,
publishing software operably running on said server,
said publishing software operable for producing and changing banner software that is used to display banners,
said publishing software comprising:
a means for selecting navigation options for the banner software, wherein the banner software is in machine readable format having a banner display means for displaying a banner on a screen on an end-user computer, said banner display means having a menu display means for presenting a menu of navigation options when an end-user clicks on said banner, and at least a portion of said navigation options are URLs on said network to which said end-user computer is connectable; and
a means for storing said banner software on said server, and
a means for distributing said banner software to said end-user computer.

50. A system as claimed in claim 49 further comprising a means for detecting a network connection and executing a transaction with a network server to determine if at least one of said banner and said navigation options should be updated.

51. A system as claimed in claim 50 further comprising a means for updating said banner and said navigation options with updates sent to said end-user computer from said server.

52. A system as claimed in claim 51 further comprising messaging software operable on said server computer for producing and sending a message that appears on the screen of end-user computers having said banner software installed and a means for displaying said message when said banner is displayed on a screen on an end-user computer.

53. A system as claimed in claim 52 further comprising an alerting means for alerting the end-user that the message has been sent to the end-user computer.

54. A system as claimed in claim 53 wherein said alerting means alters appearance of an icon on a screen of the end-user computer.

55. A system as claimed in claim 54 wherein said alerting means causes a button to be displayed or alters appearance of the button on a screen of the end-user computer.

* * * * *